United States Patent [19]

Fies, Jr. et al.

[11] Patent Number: 4,650,999

[45] **Date of Patent: * Mar. 17, 1987**

[54] METHOD OF MASS ANALYZING A SAMPLE OVER A WIDE MASS RANGE BY USE OF A QUADRUPOLE ION TRAP

[75] Inventors: William J. Fies, Jr., Portola Valley; Paul E. Kelley, San Jose; Walter E. Reynolds, Woodside; George C. Stafford, Jr., San Jose; John E. P. Syka, Sunnyvale, all of Calif.

[73] Assignee: Finnigan Corporation, San Jose, Calif.

[ * ] Notice: The portion of the term of this patent subsequent to Sep. 10, 2002 has been disclaimed.

[21] Appl. No.: 663,314

[22] Filed: Oct. 22, 1984

[51] Int. Cl.[4] .............................................. B01D 59/44

[52] U.S. Cl. .................................... 250/282; 250/286; 250/288; 250/292

[58] Field of Search ............... 250/281, 282, 283, 286, 250/292

[56] References Cited

U.S. PATENT DOCUMENTS

| | | | |
|---|---|---|---|
| 2,939,952 | 6/1960 | Paul et al. . | |
| 3,086,111 | 4/1963 | Pepes | 250/291 |
| 3,501,631 | 3/1970 | Arnold | 250/292 |
| 3,527,939 | 8/1970 | Dawson et al. . | |
| 3,617,736 | 11/1971 | Barnett et al. | 250/292 |
| 4,105,917 | 8/1978 | McIver et al. | 250/292 |
| 4,540,884 | 9/1985 | Stafford et al. | 250/292 |

OTHER PUBLICATIONS

"Radiofrequency Quadrupole Mass Spectrometers" by Lawson and Todd, pp. 373–380.

"The Characterisation of a Quadrupole Ion Storage Mass Spectrometer" by Mather, Waldren and Todd, Dynamic Mass Spectrometry, vol. 5, 1978, pp. 39–85.

"Quadrupole Ion Traps" by Todd, Lawson and Bonner, Chapter VIII, pp. 181–224.

*Primary Examiner*—Bruce C. Anderson

*Attorney, Agent, or Firm*—Flehr, Hohbach, Test, Albritton & Herbert

[57] ABSTRACT

The method of operating a quadrupole ion trap in which the mass range of interest is analyzed in segments by trapping ions of successive mass ranges within the segments whereby the operating parameters for each segment may be selected to improve sensitivity and resolution.

10 Claims, 4 Drawing Figures

METHOD OF MASS ANALYZING A SAMPLE OVER A WIDE MASS RANGE BY USE OF A QUADRUPOLE ION TRAP

The present invention is directed to a method of mass analyzing a sample over a wide mass range by use of a quadrupole ion trap.

An ion trap mass spectrometer (MS) is described in the Paul et al. U.S. Pat. No. 2,939,952 dated June 7, 1960. Actually in broader terms it is termed a quadrupole ion store. In general, a hyperbolic electric field provides an ion storage region by the use of either a hyperbolic electrode structure or a spherical electrode structure which provides an equivalent hyperbolic trapping field.

Mass storage is achieved by operating the trap electrodes with values of RF voltage, V, and frequency, f, d.c. voltage, U, and device size, $r_o$, such that ions with a range of charge to mass ratio values are stably trapped within the device. These parameters will be referred to as storage parameters and have a fixed relationship to the stored ion masses.

In copending application Ser. No. 454,351, now U.S. U.S. Pat. No. 4,540,884, there is described a method of mass analyzing a sample which comprises the steps of ionizing the sample to form ions indicative of the sample constituents. The ions in the mass range of interest are temporarily trapped in an ion storage apparatus by application of suitable d.c. and RF voltages to electrodes that provide a substantially hyperbolic electric field within the ion storage apparatus. The amplitude of the applied voltages are then varied between predetermined limits and ions of specific charge to mass ratios become sequentially and selectively unstable and exit from the ion trap. The unstable ions are detected as they exit the ion trap. The ions are identified by the scanning parameters at which they become unstable.

It is an object of the present invention to provide an improved method of operation of quadrupole ion trap mass spectrometers.

It is another object of the present invention to provide a method of operation which provides improved resolution and sensitivity for detection of ions over a wide mass range.

It is a further object of the present invention to provide a method of operation in which the detector is protected from spurious particles during $\mu$-scan periods.

It is a further object of the present invention to provide a method of operation in which the generation of spurious ions is minimized.

The foregoing and other objects of the invention are achieved by a method in which the mass range of interest is analyzed in segments to provide improved sensitivity and resolution, protecting the detector from charged particles during $\mu$-scan periods and minimizing the generation of spurious ions.

The invention will be more clearly understood from the following description and accompanying drawings of which FIG. 1 is a simplified schematic of the quadrupole ion trap embodying the present invention along with a block diagram of the associated electrical circuits.

Figure 1:
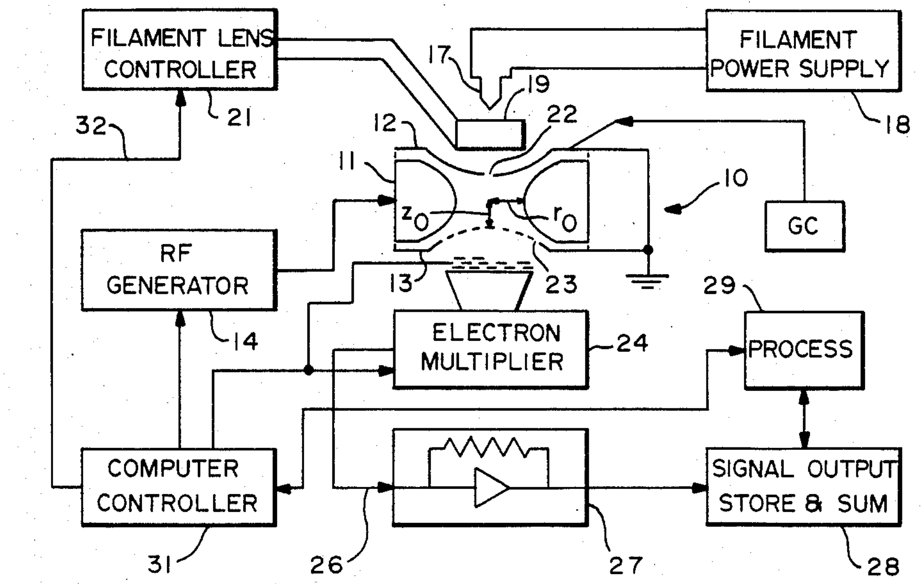

Referring first to FIG. 1, a three dimensional ion trap is shown at 10. The ion trap includes a ring electrode 11, and two end caps 12 and 13 facing one another. A radio frequency (RF) voltage generator 14 is connected to the ring electrode 11 to supply a radio frequency (RF) voltage V sin $\omega$t between the grounded end caps and the ring electrode. The voltage provides the quadrupole electric field for trapping ions within the ion storage region or volume 16. The storage region has a vertical dimension $z_o$.

Figure 3:
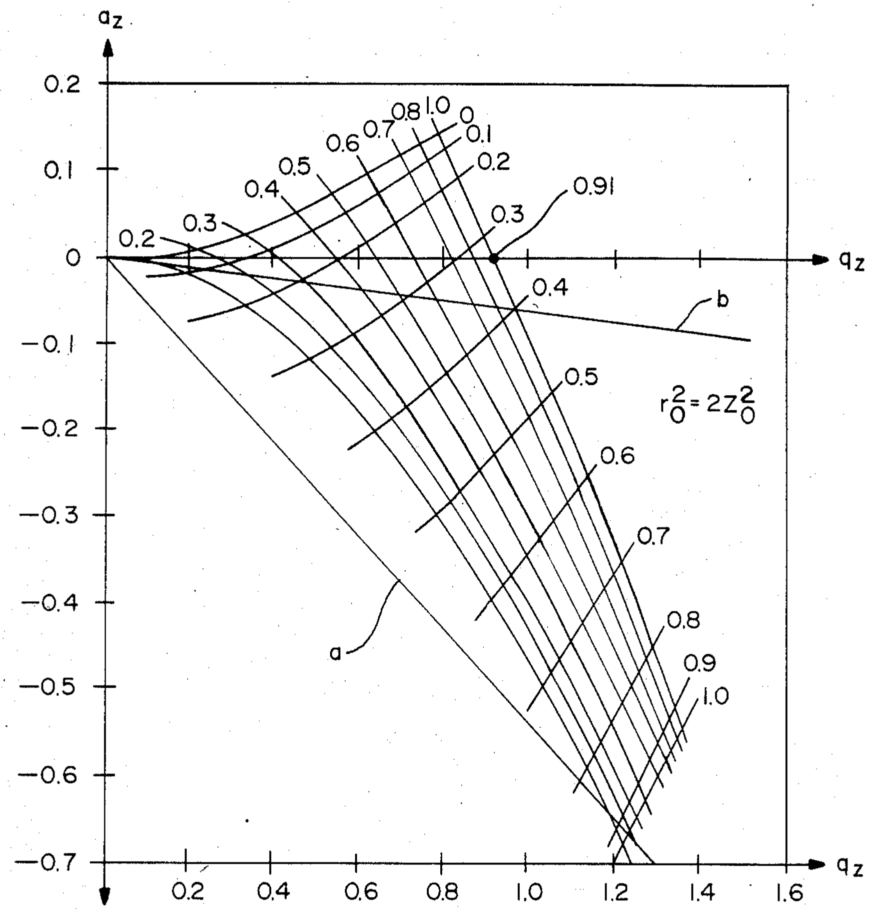
FIG. 3 is a stability envelope for an ion store device of the type shown in FIGS. 1 and 2.

The symmetric fields in the ion trap 10 lead to the stability diagram shown in FIG. 3. The ion masses that can be trapped depends on the numerical values of the scanning parameters. The relationship of the scanning parameters to the mass to charge ratio of the ions that are trapped is described in terms of the parameters "a" and "q" in FIG. 3.

These parameters are defined as:

$$a_z = \frac{-8eU}{mr_o^2\omega^2}$$

$$q_z = \frac{4eV}{mr_o^2\omega^2}$$

where

V=magnitude of radio frequency (RF) voltage

U=amplitude of applied direct current (d.c.) voltage e=charge on charged particle m=mass of charged particle $r_o$=distance of ring electrode from center of a three dimensional quadrupole electrode structure symmetry axis $z_o=r_o/\sqrt{2}$ $\omega=2\pi f$ f=frequency of RF voltage FIG. 3 shows a stability diagram for the ion trap device. For any particular ion, the values of a and q must be within the stability envelope if it is to be trapped within the quadrupole fields of the ion trap device.

The type of trajectory a charged particle has in a three dimensional quadrupole field depends on how the specific mass of the charge ratio particle, m/e, and the applied field parameters, U, V, $r_o$ and $\omega$ combine to map onto the stability diagram. If these scanning parameters combine to map inside the stability envelope then the given particle has a stable trajectory in the defined field. A charged particle having a stable trajectory in a three dimensional quadrupole field is constrained to an aperiodic orbit about the center of the fields. Such particles can be thought of as trapped by the field. If for a particle m/e, U, V, $r_o$ and $\omega$ combine to map outside the stability envelope on the stability diagram, then the given particle has an unstable trajectory in the defined field. Particles having unstable trajectories in a three dimensional quadrupole field attain displacements from the center of the field which approach infinity over time. Such particles can be thought of as escaping the field and are consequently considered untrappable.

For a three dimensional quadrupole field defined by U, V, $r_o$ and $\omega$, the locus of all possible mass to charge ratios maps onto the stability diagram as a single straight line running through the origin with a slope equal to $-2U/V$. (This locus is also referred to as the scan line.) That portion of the locus of all possible mass to charge ratios that maps within the stability region defines the range of charge to mass ratios particles may have if they are to be trapped in the applied field. By properly choosing the magnitudes of U and V, the range of specific masses of trappable particles can be selected. If the ratio of U to V is chosen so that the locus of possible specific masses maps through an apex of the stability region, line a, then only particles within a very narrow range of specific masses will have stable trajectories. However, if the ratio of U to V is chosen so that the locus of possible specific masses maps through the middle of the stability region, line b, then particles of a broad range of specific masses will have stable trajectories.

The present invention operates a three dimensional ion trap device as a mass spectrometer based on mass selective instability, rather than mass selective detection as in Paul's resonance technique or mass selective storage. In general terms the method is as follows: DC and RF voltages (U, and V cos ωt) are applied to a three-dimensional electrode structure such that ions over the entire specific mass range of interest are simultaneously trapped within the field imposed by the electrodes. Ions are then created or introduced into the quadrupole field area by any one of a variety of well known techniques. After this storage period, the DC voltage, U, the RF voltage V, and the RF frequency, ω, are changed, either in combination or singly so that trapped ions of consecutive specific masses become successively unstable. As each trapped ionic species becomes unstable, all such ions develop trajectories that exceed the boundaries of the trapping field. These ions pass out of the trapping field through perforations in the field imposing electrode structure and impinge on a detector such as an electron multiplier or a Faraday collector. The detected ion current signal intensity as function of time corresponds to a mass spectra of the ions that were initially trapped.

Referring back to FIG. 1, to provide an ionizing electron beam for ionizing the sample molecules which are introduced into the ion storage region 16, there is a filament 17 which may be Rhenium, which is fed by a filament power supply 18. The filament is on at all times. A cylindrical gate electrode and lens 19 is powered by a filament lens controller 21. The gate electrode provides control to gate the electron beam on and off as desired. End cap 12 includes an electron beam aperture 22 through which the beam projects. The opposite end cap 13 is perforated as illustrated at 23 to allow ions which are unstable in the fields of the ion trap to exit and be detected by an electron multiplier 24 which generates an ion signal on line 26. The signal on line 26 is converted from current to voltage by an electrometer 27. It is summed and stored by the unit 28 and processed in unit 29. Controller 31 is connected to the RF generator 14 to allow the magnitude or frequency of the RF voltage to be varied. This provides, as will be described below, for mass selection. The controller on the line 32 gates the filament lens controller 21 which applies voltage to the gate control electrode 19 to allow the ionizing electron beam to enter the trap only at time periods other than the scanning interval.

If the filament biasing voltage applied by the filament power supply 18 is such that electrons emitted from the filament have sufficient energy to ionize materials (i.e., above the ionization potential of materials, which is from 12.6 volts for methane to 24.5 volts for helium) then ionization will take place within the trap during the ionization pulse, but also will take place outside the trap at all times. Ions formed outside the trap will find their way to the multiplier 24 and produce unwanted signals, or noise.

However, if the electron energy is lowered below the ionization energy of methane, to say 12.5 volts, then ionization will not take place outside the trap of atoms or molecules with ionization potentials higher than 12.5 volts. However, electrons accelerated into the trap will gain energy from both the accelerating pulse voltage on the control electrode 19 and the RF field, and become energetic enough to ionize materials within the trap.

It is a feature of the invention to create electrons on a continuous basis, yet only raise them to sufficient energy to ionize material when they are inside the trap. Thus, noise is reduced at almost no loss in production of ions at the desired location in the trapping fields.

The ion trap, filament, electron multiplier and control electrode are operated under vacuum. The optimum pressure range of operation is about $1\times10^{-3}$ torr of suitable gas within the ion storage region and exterior thereto about $1\times10^{-4}$ torr.

Figure 2A:
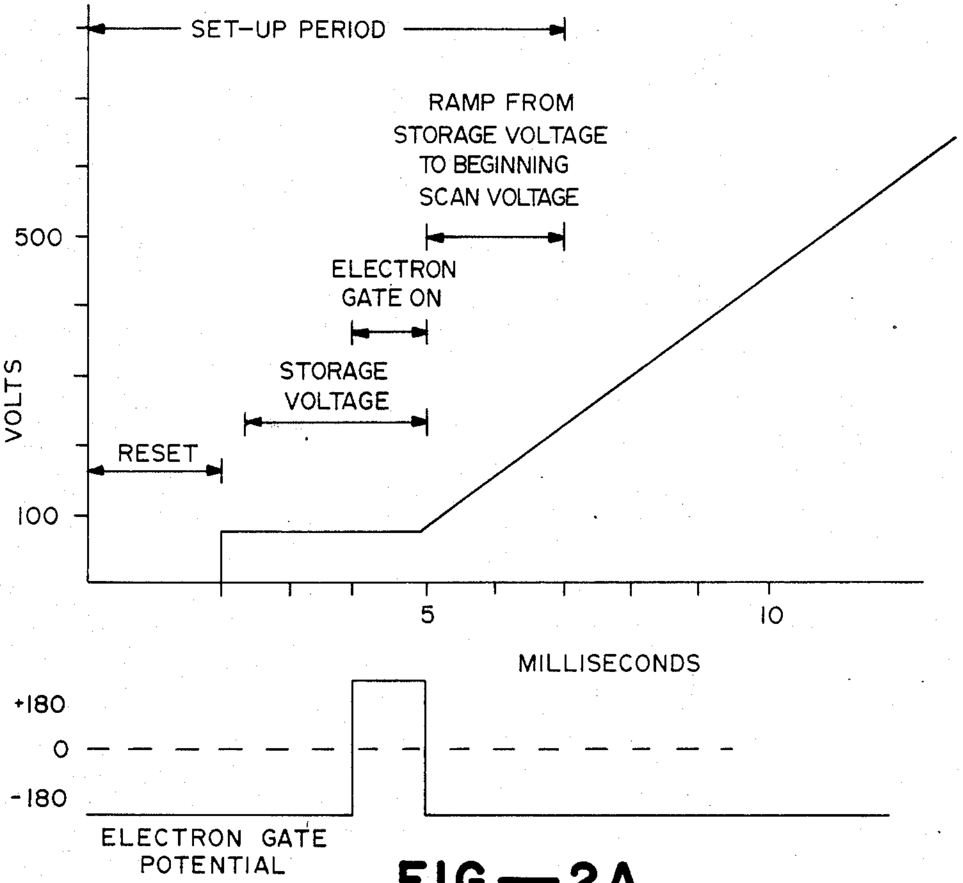
FIGS. 2A through 2B are timing diagrams illustrating the operation of the ion trap as a scanning mass spectrometer.

The three electrode structure of the ion trap is first operated at zero or very low RF voltage to clear the trap of all ions, a trapping RF voltage is then applied and when the field is established the gating electrode is gated on to allow electrons to enter the trap, and ionize the sample material where they receive energy from the RF field. All the ions which have a q on the stability diagram below about 0.91 are stored. Following this the RF field is ramped to a beginning scan voltage. The ramp rate is then changed and the trapped ions are sequentially expelled by the increasing RF voltage. The foregoing sequence of operation is shown in FIG. 2A which is an enlargement of the circled portion of FIG. 2B.

Figure 2B:
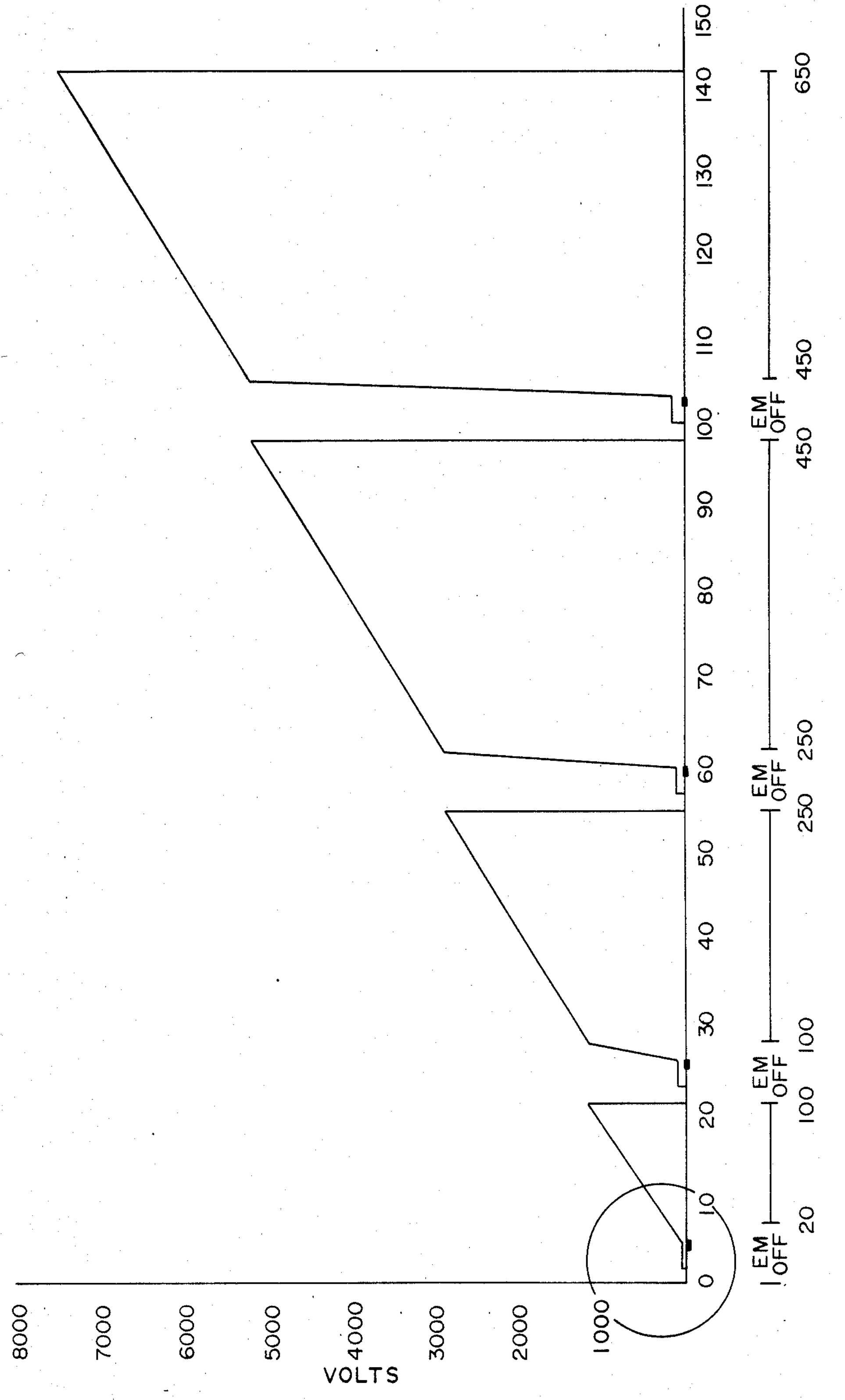

In the copending application the ion trap is operated to capture all ions in the mass range of interest. This limits the resolution and sensitivity. In accordance with the present invention, the mass range is analyzed in segments. Each segment covers a portion of the mass range. Referring to FIG. 2B the mass range in atom mass units from 20 to 650 is covered in four steps. More particularly, segment one covers from about mass 10 to mass 100, segment two from 100 to 250, segment three from 250 to 450, and four from 450 to 650. Each segment will have different storage voltage and starting mass. The spectral segments are then combined to give a full spectra of the entire range. The novel aspect of this system is the use of segmented scans to solve the characteristic of variable sensitivity and resolution across the entire region of interest.

The action of the electrons to create ions and the trapping of ions of interest may be more clearly understood from the following description.

The electrons collide and ionize neutral molecules residing in the trapping field region. After some time interval the electron beam is turned off and ionization within the trapping field ceases. Ion species created in the trapping field region whose specific masses are less than the cut-off specific mass for the trapping field very quickly (within a few hundreds of field cycles) collide with the field imposing electrodes or otherwise depart from the trapping field region. Ions created in the trapping field that have specific masses above the cut-off specific mass but which have trajectories which are so large as to cause them to impinge on the field imposing electrodes or otherwise leave the field region typically do so in a few hundred field cycles. Therefore several hundred field cycles after termination of ionization few stable or unstable ions are leaving the trapping field and possibly striking the detector 24 behind the lower end cap 13. However, there still remain a significant number of ions contained in the trapping field. During the ionizing period, a large number of charged particles are leaving the trap, via holes in the bottom end cap, and impinging upon the multiplier detector. If the multiplier voltages were adjusted so that they gave a normal gain of $10^5$, then the multiplier would be destroyed, because of this very high current.

According to another feature of the present invention, two ways of protecting the multiplier from this failure are disclosed. The first is to lower the voltage from the multiplier during the ionization pulse. This is done by means of a controller 31 which changes the multiplier voltage to a high value of from 1,400 to 3,000 volts to about 400 volts during the ionization period, then restores it to the original value. Thus, the gain is greatly lowered, and though these particles hit the detector, they do not destroy it.

The second method of protection requires an understanding of the nature of the particles coming from the trap during the ionization pulse. There are electrons, originating from the filament and traversing the interior of the trap and out the bottom. Although these will not be attracted to the multiplier, they will create ions in the region between the bottom end cap and the electron multiplier which will be attracted and give rise to signal. Secondly, there are ions which have a mass outside of the range being trapped. These are mainly helium ions, but small amounts of others. Thirdly, there are neutral particles in an excited energy state.

In order to remove these particles, two grids are placed between the multiplier and the bottom end cap. The one closest to the end cap is biased negatively at a potential sufficient to stop all electrons, about 40 volts. This voltage also serves to accelerate positive ions. It is left on at all times to prevent electrons from traversing this region at all times. The second grid is pulsed positively during the ionization pulse period at a potential sufficient to stop all positive ions coming from the end cap, several hundred volts.

Following the ionization period the magnitude of the trapping field potential is ramped. Following the set up period, the ion signal from the detector is reduced.

As the applied RF voltage V increases, stored ions become sequentially unstable in order of increasing specific mass. Ions that become sequentially unstable during this voltage change, do so primarily in the axial direction of motion. This means that as trapped ions attain instability because of the changing trapping field intensity, they rapidly depart the trapping field region in the direction of one or the other end cap electrodes. Since the lower end cap electrode in the device shown in FIG. 1 is perforated, a significant percentage of unstable ions transmit through this electrode and strike the detector 24. If the change sweep rate of the RF voltage is chosen so that ions of consecutive specific masses are not made unstable at a rate faster than the rate at which unstable ions depart the trapping field region, the time intensity profile of the signal detected at the electron multiplier will correspond to a mass spectrum of the ions originally stored within the trapping field.

In the above example the three-dimensional ion trap electrodes were driven with a purely RF voltage, and the magnitude of that voltage was changed. However, the basic technique claimed applies equally well to situations where there is an applied d.c. voltage, U, in addition to the RF voltage, V, between the ring electrode and the end cap electrodes. Such operation would just place an upper limit on the range of specific masses that may be mass analyzed in a given experiment. While maintaining a constant ratio between the applied RF and d.c. potentials (U and V) is convenient, in that the magnitudes of the voltages relate linerally to the specific mass of the detected ions, it is not inherent in the technique. While changing one or both of the applied d.c. and RF voltages to mass sequentially destabilize ions is easy to implement, but there is no theoretical reason why one shouldn't manipulate the frequency, $\omega$, of the applied RF trapping voltage or some combination of $\omega$, U and V to accomplish the same thing. While it is convenient from the standpoint of ion collection and detection to have specific mass selected ions become unstable in the axial direction, a three electrode trap operating according to the described principle could be operated so that mass selected ions would have unstable trajectories in the radial directions and reach a detector by transmitting through the ring electrode.

What is claimed:

1. The method of mass analyzing a sample over a mass range of interest which comprises the steps of:
- sequentially defining a plurality of different three dimensional quadrupole fields in which sample ions over a corresponding segment of the mass range of interest can be simultaneously trapped;
- introducing or creating sample ions into each quadrupole field whereby ions within each segment in the mass range of interest are trapped;
- changing the three dimensional trapping field for each segment so that trapped ions of consecutive specific masses within said segment become sequentially unstable and leave the trapping field;
- detecting the successive unstable ions as they leave the trapping field; and
- providing an output signal indicative of the ion mass for each segment and the entire mass range of interest.

2. The method as in claim 1 in which the field is generated by an ion trap of the type having a ring electrode and spaced end electrodes where the field is defined by U, V and $\omega$ where
- U=amplitude of direct current voltage between the end electrodes and ring electrode
- V=magnitude of RF voltage applied between ring electrodes
- $\omega = 2\pi f$
- f=frequency of RF voltage.

3. The method of claim 2 in which each three dimensional quadrupole trapping field is changed by changing any one or more of U, V and $\omega$.

4. The method of claim 2 in which each three dimensional quadrupole trapping field is changed by linearly increasing the voltage and the initial voltage in each successive segment equals the ending voltage of the previous segment.

5. The method of mass analyzing a sample over a mass range of interest comprises the steps of:
- sequentially defining a plurality of different three dimensional quadrupole field in which sample ions in corresponding sequential segments of the mass range of interest can be simultaneously trapped;
- introducing the sample into each quadrupole field;
- generating an ionizing electron beam;

gating said beam into the quadrupole fields for each segment whereby ions are formed and trapped;

changing the three dimensional trapping field for each segment so that trapped ions of consecutive specific masses within said segment become successively unstable and leave the trapping field;

detecting the successive unstable ions as they leave the trapping field; and providing an output signal indicative of the ion mass for each segment and the entire mass range of interest.

6. The method as in claim 5 in which the ionizing electrons are generated at a voltage below the ionization energy of the sample material whereby ionization does not occur outside the trap but occurs in the quadrupole fields when the electrons are gated into the fields because of the energy added by the fields.

7. The method of mass analyzing a sample over a mass range of interest which comprises the steps of:

sequentially defining a plurality of different three dimensional quadrupole fields in which sample ions over a corresponding segment of the mass range of interest can be simultaneously trapped;

creating sample ions in each quadrupole field by directing an electron beam into the quadrupole field whereby ions within segments in the range of interest are trapped;

changing each three dimensional trapping field so that trapped ions of consecutive specific masses within said segment become successively unstable and leave the trapping field;

detecting the successive unstable ions with a suitable detector as they leave the trapping field; and providing an output signal indicative of the ion mass for each segment and the entire mass range of interest.

8. The method as in claim 7 including the step of protecting the detector from electrons and charged particles during periods between detection of the trapped sample ions in sequential segments leave the trapping field during a scanning cycle.

9. The method as in claim 7 in which the detector is protected by lowering the voltage on the detector.

10. The method as in claim 7 in which the detector is protected by providing a first grid at the entrance to the detector operated at negative voltage to block electrons, and a second grid operated at a positive potential during the creation of sample ions to block positive ions.

* * * * *